United States Patent
Patel

(10) Patent No.: US 11,238,523 B2
(45) Date of Patent: Feb. 1, 2022

(54) CONTACTING PROCESS FOR ONLINE MARKETPLACE

(71) Applicant: Rohan Vishnubhai Patel, Bensalem, PA (US)

(72) Inventor: Rohan Vishnubhai Patel, Bensalem, PA (US)

( * ) Notice: Subject to any disclaimer, the term of this patent is extended or adjusted under 35 U.S.C. 154(b) by 0 days.

(21) Appl. No.: 16/703,941

(22) Filed: Dec. 5, 2019

(65) Prior Publication Data

US 2020/0111155 A1 Apr. 9, 2020

(51) Int. Cl.
| | |
|---|---|
| *G06Q 30/00* | (2012.01) |
| *G06Q 30/06* | (2012.01) |
| *G06Q 30/02* | (2012.01) |
| *G06Q 40/04* | (2012.01) |
| *G06Q 30/08* | (2012.01) |

(52) U.S. Cl.
CPC ......... *G06Q 30/0641* (2013.01); *G06Q 30/02* (2013.01); *G06Q 30/0609* (2013.01); *G06Q 30/0633* (2013.01); *G06Q 30/08* (2013.01); *G06Q 40/04* (2013.01)

(58) Field of Classification Search
CPC .................................................... G06Q 40/04
See application file for complete search history.

(56) References Cited

U.S. PATENT DOCUMENTS

| | | | | |
|---|---|---|---|---|
| 8,533,075 B1* | 9/2013 | Sayers, III | ............. | G16H 40/20 705/28 |
| 9,745,130 B1* | 8/2017 | Rawal | ................ | G06Q 10/0836 |
| 2002/0007324 A1* | 1/2002 | Centner | ................. | G06Q 30/02 705/80 |
| 2002/0174021 A1* | 11/2002 | Chu | ..................... | G06Q 10/063 705/7.11 |
| 2006/0116935 A1* | 6/2006 | Evans | .................. | G06Q 20/322 705/26.62 |
| 2008/0086387 A1* | 4/2008 | O'Rourke | .......... | G06Q 30/0601 705/26.1 |
| 2013/0009774 A1* | 1/2013 | Sabeta | ................. | G06Q 30/016 340/540 |
| 2014/0231502 A1* | 8/2014 | Marsico | ............. | G06Q 30/0203 235/375 |
| 2015/0170164 A1* | 6/2015 | Marsico | ............. | G06Q 30/0201 235/375 |
| 2019/0147444 A1* | 5/2019 | Nelms | .................. | G06F 16/9554 705/44 |
| 2019/0213573 A1* | 7/2019 | Zelten | .................. | G06Q 20/209 |
| 2019/0244214 A1* | 8/2019 | Flores | .................. | G06Q 20/407 |

OTHER PUBLICATIONS

Abhaya Asthana et al. "An Indoor Wireless System for Personalized Shopping Assistance", Mobile Computing System and Applications, 1994, pp. 69-74. (Year: 1994).*

\* cited by examiner

*Primary Examiner* — Naeem U Haq

(57) ABSTRACT

A contacting process for an online marketplace is provided. The contacting process includes scanning a scan-able code in an online marketplace environment running on a handheld device of a user. The scan-able code is associated with a predefined seller of a predefined product. The user automatically login to the online marketplace environment using pre-stored login credentials stored in the handheld device. This enables contact between the user and the predefined seller.

4 Claims, 4 Drawing Sheets

CONTACTING PROCESS FOR ONLINE MARKETPLACE

CROSS-REFERENCE TO RELATED APPLICATIONS

None.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

BACKGROUND OF THE INVENTION

Field of the Invention

The present disclosure relates generally to an online marketplace. More so, the present invention relates to a contacting process for an online marketplace.

Description of the Related Art

Online marketplaces have become common these days. A large population uses these online market places to shop of their daily needs as well as their special needs. Buying on a typical online market place requires user to execute several steps before user can buy or even contact with a seller.

While several online market places have tried to simplify user experience, but they require user to follow several steps before he can place an order of a product or even enquire about a product from a seller.

In light of the above mentioned drawbacks, there exists a contacting process for an online marketplace that is simple and efficient.

BRIEF SUMMARY OF THE INVENTION

A primary object of the disclosure is to provide a contacting process for an online marketplace.

Another object of the present disclosure is to provide a simple and efficient contacting process for an online marketplace.

Yet another object of the present disclosure is to provide a contacting process for an online marketplace that allows a user to contact a seller in a less number of steps.

DESCRIPTION OF THE DRAWINGS

Figure 1:
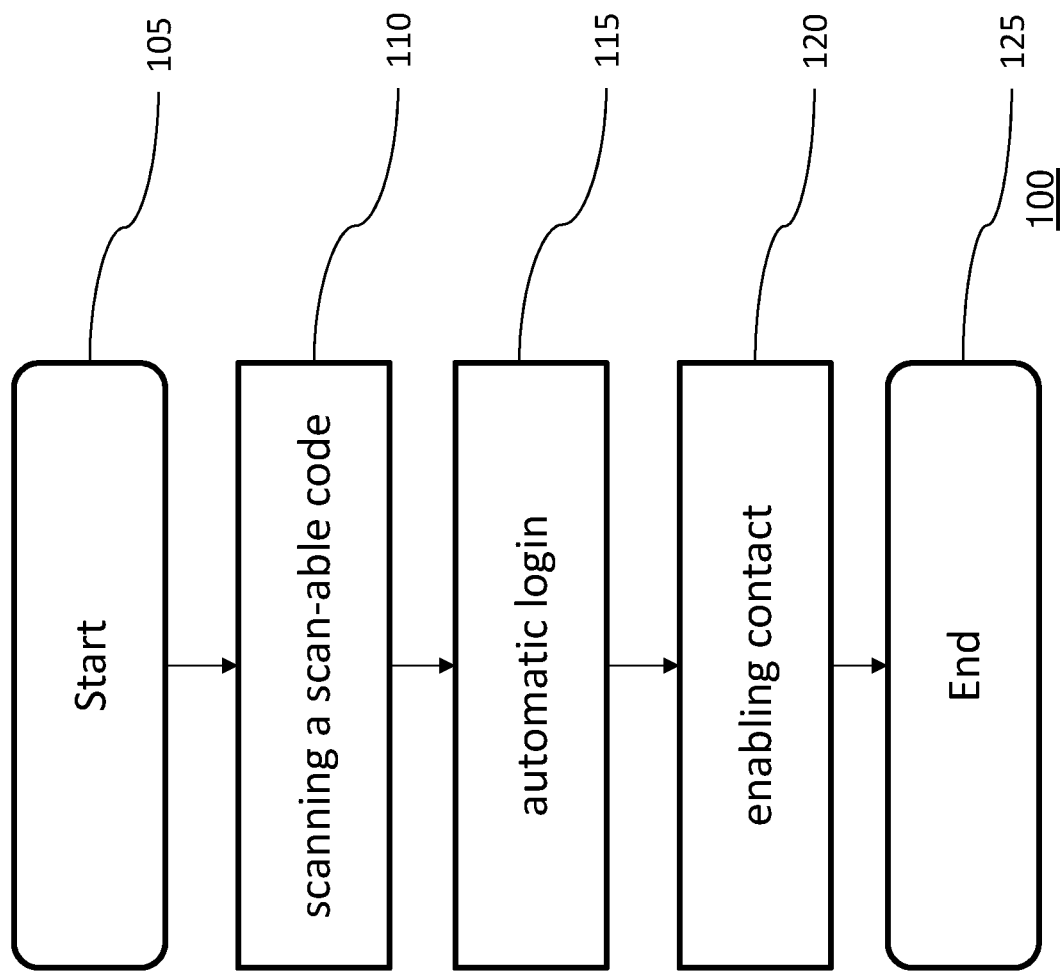
Figure 2:
Figure 3:
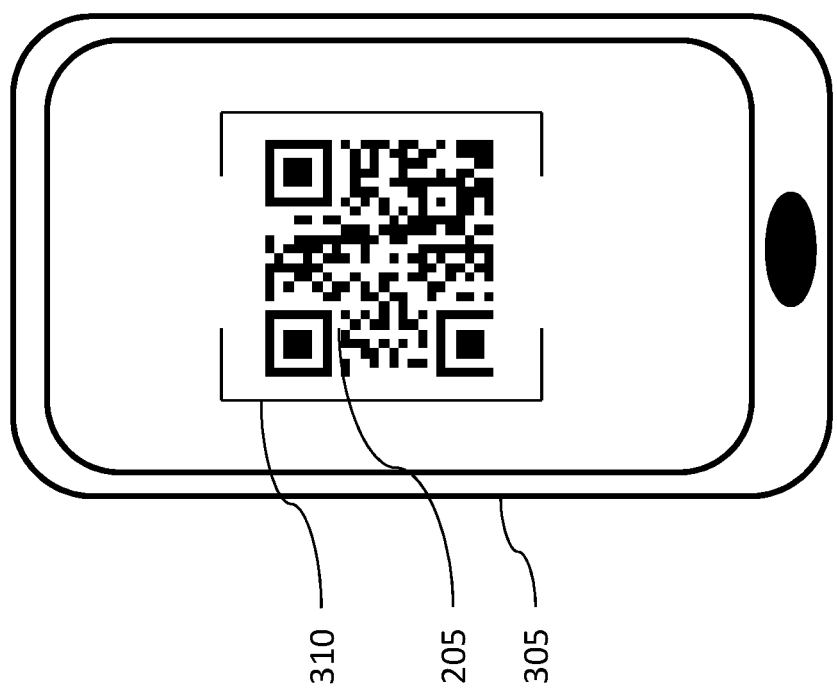

Having thus described the disclosure in general terms, reference will now be made to the accompanying figure, wherein:

FIG. 1 illustrates a contacting process for an online marketplace, in accordance with an embodiment of the present disclosure;

FIG. 2 illustrates an exemplary scan-able code, in accordance with another embodiment of the present disclosure;

FIG. 3 illustrates scanning of the scan-able code in an exemplary online marketplace environment, in accordance with an embodiment of an invention.

Figure 4:
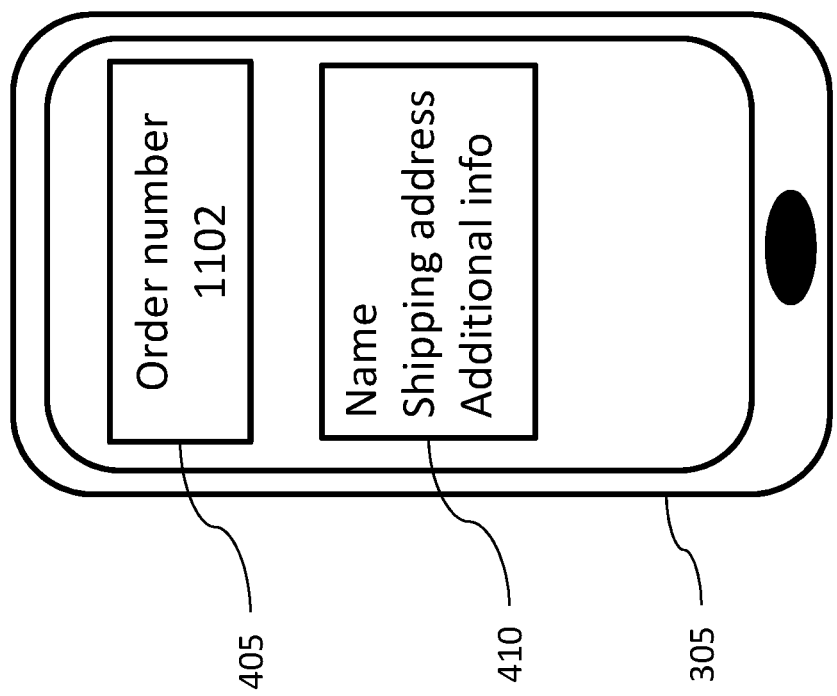

FIG. 4 illustrates information received by a seller of that product along with order related information of buyer if there is any, with buyer's message if there is any. the online marketplace environment showing contact between a user and a predefined seller, in accordance with an embodiment of an invention.

It should be noted that the accompanying figure are intended to present illustrations of exemplary embodiments of the present disclosure. This figure is not intended to limit the scope of the present disclosure. It should also be noted that accompanying figure is not necessarily drawn to scale.

DETAILED DESCRIPTION OF THE INVENTION

Reference will now be made in detail to selected embodiments of the present disclosure in conjunction with accompanying figures. The embodiments described herein are not intended to limit the scope of the disclosure, and the present disclosure should not be construed as limited to the embodiments described. This disclosure may be embodied in different forms without departing from the scope and spirit of the disclosure. It should be understood that the accompanying figure is intended and provided to illustrate embodiments of the disclosure described below and are not necessarily drawn to scale. In the drawing, like numbers refer to like elements throughout, and thicknesses and dimensions of some components may be exaggerated for providing better clarity and ease of understanding.

It should be noted that the terms "first", "second", and the like, herein do not denote any order, ranking, quantity, or importance, but rather are used to distinguish one element from another. Further, the terms "a" and "an" herein do not denote a limitation of quantity, but rather denote the presence of at least one of the referenced item.

FIG. 1 illustrates a contacting process 100 for an online marketplace, in accordance with an embodiment of the present disclosure.

At step 110 of the contacting process 100, scanning a scan-able code in a marketplace environment (a marketplace application) using a handheld device of a user such as a mobile phone or a tablet. The scan-able code is associated with a predefined seller of a predefined product. For example, a perfume of Brand A with a seller being X can have a scan-able code that will include information regarding the product and the seller. The scan-able code can be a bar code, a QR code or any other identification. An exemplary scan-able code is shown in FIG. 2. It should be noted that the scan-able code can contain additional information as per requirements. The scan-able code is scanned in an online marketplace environment on the handheld device. The online marketplace environment can be a marketplace application or a website (an application or software) that runs on a mobile phone of a user.

As soon as the user scans the scan-able code with a handheld device in the online marketplace environment, at step 115, the user is automatically logged into the in the online marketplace environment (a marketplace app or a marketplace website) using pre-stored login credentials. The pre-stored login credentials are associated with the user and are stored in the handheld device. For example, as soon as a user scans a scan-able code printed on a perfume of Brand A, the online marketplace environment looks for login credentials stored on the user's handheld device. If the login credentials are found on the handheld device, the user is automatically logged into the online marketplace environment (an app).

Further, at step 120, contact between the user and the predefined seller is initiated. The predefined seller can be a retailer, a distributor, an importer or a manufacturer. In an embodiment of the present disclosure, the contact is initiated to the nearest contact person using a marketplace environment. It should be understood to a person ordinarily skilled in the art that the predefined seller can be any entity selling the required product. In an embodiment of the present disclosure, the user sends a user defined message to the predefined seller. For example, a user can ask for delivery time of the product at his address. In another example, a user can enquire about a specific feature of the product from the predefined seller. In another embodiment of the disclosure, the user can place an order for the product and order information along with a user message can be sent to the predefined seller. In yet another embodiment of the present disclosure, the contacting process 100 can be used to return a product. For example, a user may already have an order, and inquiring about it returning his order. Now here the buyer does not include any information at all about the order but since they are sending this message being logged into the marketplace environment, the marketplace will link buyer's message with an order of that buyer if there is anything the buyer have purchased using this login credentials.

FIG. 2 illustrates an exemplary scan-able code 200, in accordance with an embodiment of an invention. The scan-able code 200 is shown to be a bar code 210 or a QR code 205; however, it will be understood to a person ordinarily skilled in the art that the scan-able code 200 can be any other identification mark that include product identification and seller identification.

FIG. 3 illustrates scanning of the scan-able code 200 in an exemplary online marketplace environment 300, in accordance with an embodiment of an invention. A user opens the online marketplace environment 300 on his handheld device 305 to scan the scan-able code 200. The online marketplace environment 300 uses the camera of the handheld device 305 to scan the scan-able code 200.

FIG. 4 illustrates the online marketplace environment 300 showing the information received by a predefined seller which includes buyer's message 410 along with all order(s) related information 405, if any, and conversation history, if any. It will be understood to a person ordinarily skilled in the art that the contact can be intimation to the seller, a user defined message 410, the order information 405 or any other combination of information to be shared with the seller.

What is claimed is:

1. A method of establishing a direct communication through an online marketplace of a buyer with a pre-defined seller of a product purchased from the online marketplace comprising:
   a. consisting of providing purchasing of the product with a QR code that is both associated directly with an online marketplace contact of the pre-defined seller and compatible with the online marketplace application installed on a handheld device, to the buyer with a login credentials for the online marketplace through a website or an application of the online marketplace installed on a handheld device, wherein the QR code is on the product;
   b. consisting of allowing scanning of the QR code, of the product purchased from the online marketplace, using the handheld device with the login credentials, used in purchasing of the product with the QR code, of the online marketplace stored within;
   c. allowing the buyer through the online marketplace, from where the product with the QR code was purchased, to initiate a contact with the predefined seller of the product, wherein the buyer initiated contact is a buyer defined message;
   d. sending the buyer defined message and linking it to the order information to the predefined seller associated with the QR code scanned in step b.

2. The contacting process as claimed in claim 1, wherein the contacting process is used to initiate a return of the product.

3. The contacting process as claimed in claim 1, wherein the contact is initiated to the pre-defined seller nearest to the buyer using the online marketplace.

4. The contacting process as claimed in claim 1, wherein the buyer defined message received by the pre-defined seller also includes a conversation history with the buyer.

* * * * *